(12) United States Patent
Suarez et al.

(10) Patent No.: US 11,927,441 B1
(45) Date of Patent: Mar. 12, 2024

(54) SELF-MIXING INTEFEROMETRY SENSOR MODULE, ELECTRONIC DEVICE AND METHOD OF DETERMINING AN OPTICAL POWER RATIO FOR A SELF-MIXING INTEFEROMETRY SENSOR MODULE

(71) Applicant: ams International AG, Jona (CH)

(72) Inventors: Ferran Suarez, Chandler, AZ (US); Daniel Najer, Rotkreuz (CH)

(73) Assignee: AMS INTERNATIONAL AG, Jona (CH)

( * ) Notice: Subject to any disclaimer, the term of this patent is extended or adjusted under 35 U.S.C. 154(b) by 0 days.

(21) Appl. No.: 17/821,077

(22) Filed: Aug. 19, 2022

(51) Int. Cl.
  *G01B 9/02097* (2022.01)
  *G01B 9/02* (2022.01)

(52) U.S. Cl.
  CPC ..... *G01B 9/02092* (2013.01); *G01B 9/02097* (2013.01)

(58) Field of Classification Search
  CPC .................. G01B 9/02092; G01B 9/02097
  See application file for complete search history.

(56) References Cited

U.S. PATENT DOCUMENTS

| | | | |
|---|---|---|---|
| 2018/0209779 A1* | 7/2018 | Van Der Lee | G01N 15/06 |
| 2018/0224368 A1* | 8/2018 | Spruit | G01N 15/06 |
| 2019/0331473 A1* | 10/2019 | Johnson | G01B 9/0205 |
| 2020/0370879 A1* | 11/2020 | Mutlu | G06F 3/011 |
| 2021/0003385 A1* | 1/2021 | Tan | G01B 11/026 |
| 2021/0080245 A1 | 3/2021 | Mutlu et al. | |
| 2021/0080248 A1 | 3/2021 | Cihan et al. | |
| 2022/0099431 A1 | 3/2022 | Chen et al. | |

OTHER PUBLICATIONS

Grabherr et al., "Integrated photodiodes complement the VCSEL platform", Proceedings of SPIE—The International Society for Optical Engineering, Feb. 2009, 10 pages.
Bhardwaj, V. K. et al.: "Impact analysis of different trade-off parameters on coherent sensing applications of single-mode selfmixing optical feedback interferometry" Optical and Quantum Electronics, Springer US, New York, vol. 53, No. 8, Aug. 1, 2021, p. 481-p. 482.

(Continued)

*Primary Examiner* — Jonathan M Hansen
(74) *Attorney, Agent, or Firm* — MH2 TECHNOLOGY LAW GROUP LLP

(57) ABSTRACT

A self-mixing interferometry sensor module, comprising a light emitter (LE), a detector unit (DU) and an optical element (OE), wherein the light emitter (LE) is operable to emit coherent electromagnetic radiation towards an external object (ET) to be placed outside the sensor module and undergo self-mixing interference, SMI, caused by reflections of the emitted electromagnetic radiation from the external object back inside the sensor module. The detector unit (DU) is operable to generate output signals indicative of an optical power output of the light emitter (LE) due to the SMI. The optical element (OE) is aligned with respect to the light emitter (LE) such that a first fraction of electromagnetic radiation is directed towards the external target (ET) or the light emitter (LE) and a second fraction of electromagnetic radiation is directed towards the detector unit (DU). An optical power ratio determined by the first and second fractions meets a pre-determined value.

19 Claims, 5 Drawing Sheets

(56) References Cited

OTHER PUBLICATIONS

Masiyano, D. et al.: "Self-mixing interference effects in tunable diode laser absorption spectroscopy" Applied Physics B; Lasers and Optics, Springer, Berlin, DE, vol. 96, No. 4, Aug. 6, 2009, pp. 863-874.
Zakian, C. et al.: "Self-mixing interferometry with a laser diode: experimental considerations for sensing applications" Journal of Optics. A, Pure and Applied Optics, Institute of Physics Publishing, Bristol, GB, vol. 8, No. 6, Jun. 1, 2006, pp. 555-568.
Moser, U. (Authorized officer) International Search Report and Written Opinion issued in PCT/EP2023/070277 dated Oct. 25, 2023, 20 pages.

\* cited by examiner

FIG 2
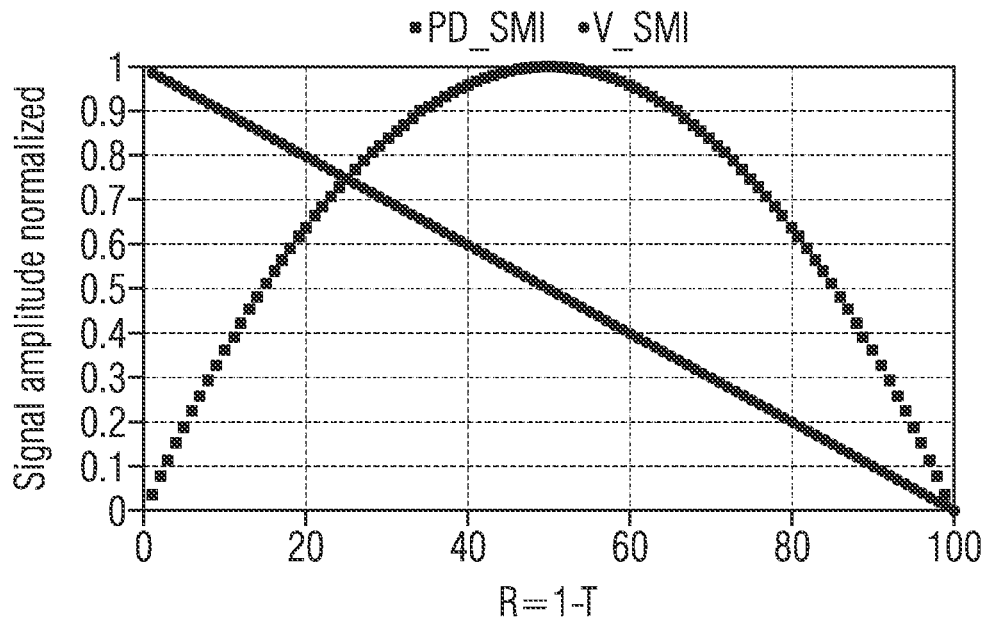
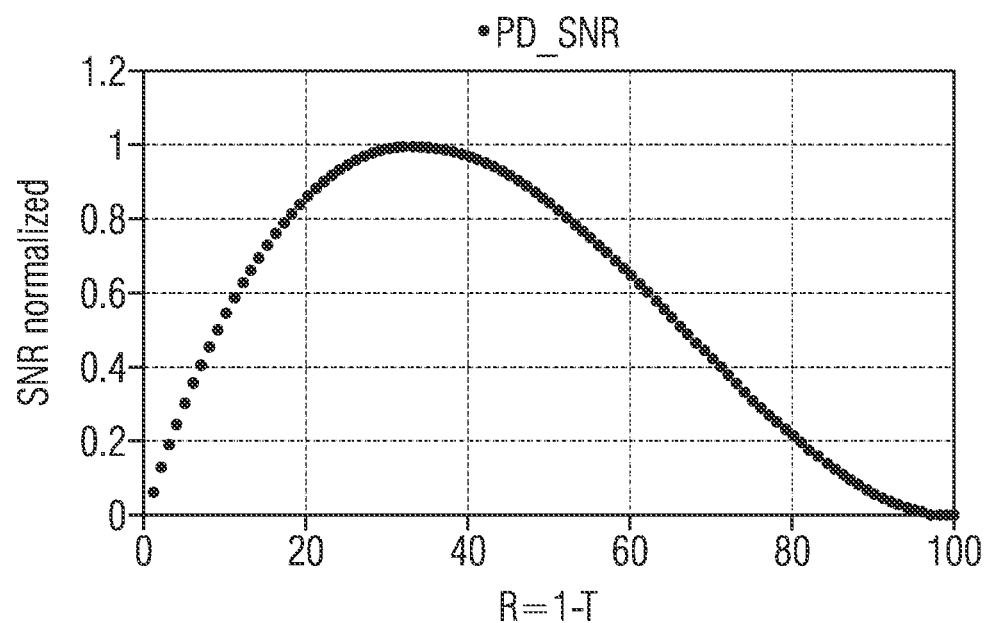

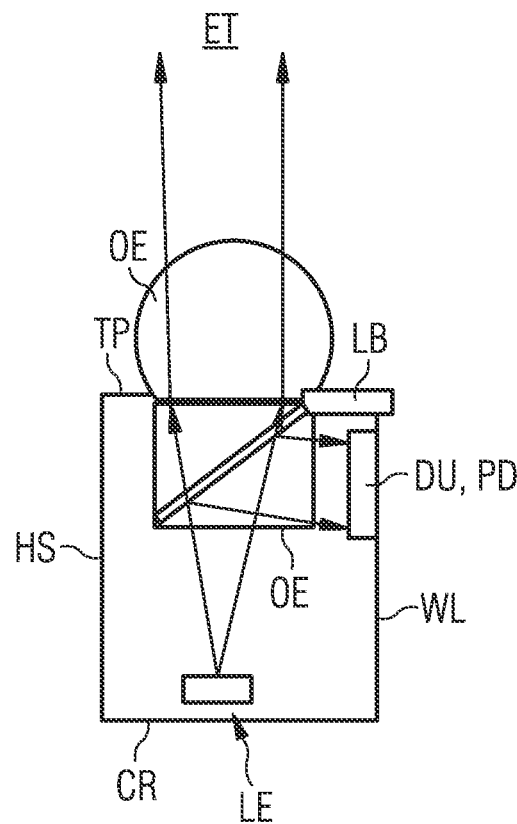
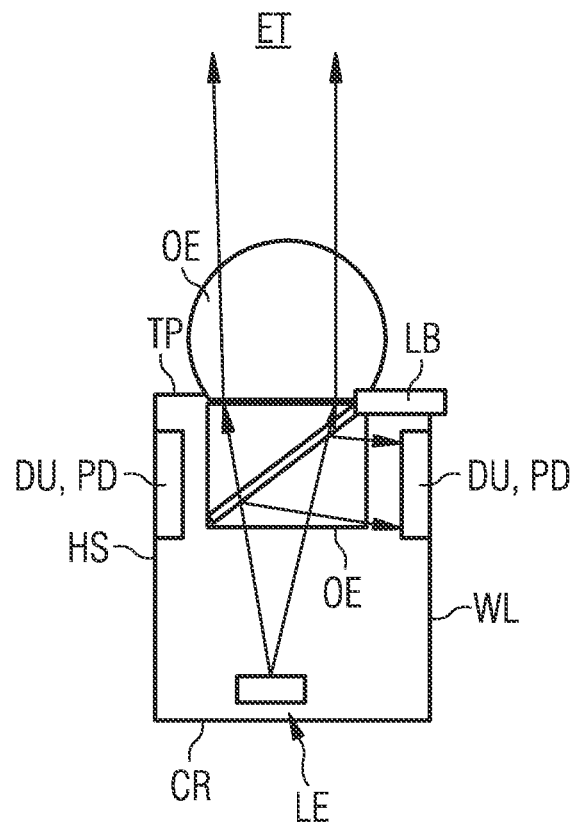

SELF-MIXING INTEFEROMETRY SENSOR MODULE, ELECTRONIC DEVICE AND METHOD OF DETERMINING AN OPTICAL POWER RATIO FOR A SELF-MIXING INTEFEROMETRY SENSOR MODULE

FIELD

This disclosure relates to a self-mixing interferometry sensor module, an electronic device and to a method of determining an optical power ratio for a self-mixing interferometry sensor module.

BACKGROUND OF THE DISCLOSURE

In recent years self-mixing interferometry, or SMI, has become available for sensing and monitoring distance and speed using mobile electronic devices, such as smartphones, watches, and other wearable devices. For example, SMI has successfully been applied to sensing and/or monitoring physiological parameters or a fingerprint of a user.

Self-mixing interference occurs when part of the light emitted from a coherent light source is retro-fed back into the coherent source cavity (e.g., a laser such as a vertical-cavity surface-emitting laser, or VCSEL, or as a distributed feedback laser, or DFB). In turn, the coherent light source cavity produces a change in carrier population and refractive index. That change can be observed in a threshold current or threshold voltage change as well as on the optical power emitted by the cavity.

A convenient case to observe self-mixing interference is provided by monitoring a laser voltage change at constant drive current or vice versa. In some cases, however, the threshold electrical characteristics produce lower signal-to-noise ratio, SNR, SMI signal than using the optical power. To monitor the optical power, a readout or detector unit is used where the optical signal is transformed into an electrical signal. The power readout unit may be composed of a photodetector or a photodetector array. In this case, the readout unit has to interact with the optical beam path of the coherent light source to sample the SMI signal. To date, there is no established concept to calculate an optimum power splitting target/readout for SMI applications.

One object is to provide a sensor module for electronic devices that overcomes the above limitations of existing solutions. A further object is to provide an electronic device comprising such a sensor module and to provide a method of determining an optical power ratio for a self-mixing interferometry sensor module.

These objects are achieved with the subject-matter of the independent claims. Further developments and embodiments are described in dependent claims.

SUMMARY OF THE DISCLOSURE

The following relates to an improved concept in the field of optical sensing. One aspect relates to a self-mixing interferometry sensor module, which implements an improved optical power ratio for self-mixing interferometry. The improved concept further suggests a method which analyzes the optimum power ratio (given a set of starting parameters) between light going to a target to induce SMI and power diverted to the detector unit to measure the SMI signal.

The splitting ratio used to detect the SMI signal in power read out configuration can be used as a guideline to implement self-mixing interferometry sensor modules, which ultimately can be integrated into electronic devices.

In at least one embodiment, a self-mixing interferometry sensor module comprises a light emitter, a detector unit and an optical element.

The light emitter is operable to emit coherent electromagnetic radiation towards an external object to be placed outside the sensor module. The light emitters is operable to undergo self-mixing interference, SMI, caused by reflections of the emitted electromagnetic radiation from the external object back inside the sensor module.

The detector unit is operable to generate output signals which are indicative of an optical power output of the light emitter due to SMI.

The optical element is aligned with respect to the light emitter such that a first fraction of electromagnetic radiation is directed towards the external target and/or the light emitter and a second fraction of electromagnetic radiation is directed towards the detector unit to generate the output signals. Furthermore, the optical element is aligned with respect to the light emitter such that an optical power ratio of the first and second fractions meets a pre-determined value.

The pre-determined value allows to account for a desired or an optimal power splitting between emission towards the target and readout for SMI applications. For example, if too much returning light is coupled out and directed to the detector unit, the SMI process may be affected as a lower fraction of light may contribute to SMI, e.g. to a degree where change in carrier population and refractive index may no longer be a unique measure of distance and speed of the external target. In turn, if too less returning light is coupled out and directed to the detector unit, then detection at the detector unit may be affected, e.g. too low an SNR is possible, thus, also affecting accuracy of the measurement. The pre-determined value allows to balance the optical power ratio associate with the first and second fractions. For example, pre-determined value allows to set the optical power ratio to optimize SNR of generated output signals of the detector unit, while keeping the SMI feedback in an optimum level.

For example, the light emitter is arranged to enable self-mixing interference, and typically comprises a cavity resonator, into which at least a fraction of the light emitted by the light emitter can be reflected, or backscattered, from the external target outside the module. For example, the light emitter is implemented as a laser diode and comprises a laser cavity. The light emitter is configured to emit coherent light, e.g. in an infrared (IR), visible or ultraviolet (UV) range of the electromagnetic spectrum, out of the sensor module. For example, the light emitter is configured to generate a continuous emission or to emit light in a pulsed fashion, the latter potentially aiding in an overall reduction of power consumption.

Upon the aforementioned back-injection of the emitted light into the cavity, the light is reflected off a distance of the external target and the light emitter undergoes self-mixing interference which includes information of the distance, and, potentially speed of the external target.

For example, when the emitted electromagnetic field from the laser cavity is reflected back into the cavity and changes its phase due to target distance changes, it causes a modulation in the amplitude and/or frequency of the solitary laser electromagnetic light field due to interference process. The self-mixing interference generates periodic fringes in the signal of the solitary laser. More accurately, SMI modulates the optical power (which is observed by measuring it in a photodetector, photocurrent of the detector unit, for example) and the threshold laser gain (which can be detected monitoring the laser voltage or laser current). Another way to generate SMI is through the modulation of the laser emission wavelength, e.g. ramping the laser current periodically (via triangular function current ramp or changing the laser cavity via a MEMS mirror).

When no external target is present outside the module in the field of emission of the light source to intercept and reflect light of the latter, no self-mixing interference occurs within the light emitter.

As discussed above, SMI eventually alters a property of the light emitter. This property is indirectly measured by means of the detector unit, which generates the output signals as a function of said property, or change of said property. The output signals may, in addition, be a measured current or voltage, for example. Thus, the detector unit may have means, e.g. active or passive circuitry, to measure said change as an electronic property.

In at least one embodiment, the optical power ratio is a function of an overall splitting ratio $T_{BS}/R_{BS}$ of the optical element, wherein $T_{BS}$ denotes the transmission of the optical element (OE) with respect to the first fraction and $R_{BS}$ denotes the reflection of the optical element (OE) with respect to the second fraction of electromagnetic radiation.

The optical element can be a single optical component, such as a lens or beam splitter. Then the terms $T_{BS}$ and $R_{BS}$ relate to transmission and reflection of the single optical component. However, the optical element can be a hybrid system of multiple optical components. Then the terms $T_{BS}$ and $R_{BS}$ relate to overall transmission and reflection of the hybrid system and its optical components acting together.

The optical element provides the "hardware" means to implement the pre-determined value of the optical power ratio into the sensor module. One parameter which can be adjusted at the level of the optical element in order to implement the optical power ratio is given by the overall splitting ratio of transmission and reflection $T_{BS}/R_{BS}$ of the optical element. These parameters are closely interlinked as $R_{BS}=1-T_{BS}$. The splitting ratio determines the relative amounts to light which is directed towards the external target and/or the light emitter ($T_{BS}$) which is directed towards the detector unit to generate the output signals ($R_{BS}$).

The splitting ratio can be affected by various parameters, as will be discussed in more detail below. These parameters include optical properties of the materials used for the optical element, e.g. different transmission and reflection for a given wavelength emitted by the light emitter.

Furthermore, the optical shape of the optical element, or one of its components, may also affect transmission and reflection. In addition, the overall splitting ratio of transmission and reflection is also set by the alignment of the optical element, with respect to the light emitter, for example. The alignment determines the angles of incidence, for example, and thus, transmission and reflection.

In conclusion, the overall splitting ratio $T_{BS}/R_{BS}$ of the optical element provides a means to implement the predetermined optical power ratio with a large degree of design freedom.

In at least one embodiment, the optical power $P_{SMI,DU}$ associated with the second fraction of electromagnetic radiation, which is directed to the detector unit, is determined by $$P_{SMI,DU}=P_{SMI} \cdot R_{BS}$$

wherein $P_{SMI}$ denotes the optical power associated with the first fraction directed to or emitted by the light emitter as a result of SMI. When implementing the sensor module according to the pre-determined value, then the optical power received by the detector unit reaches a local or global maximum.

In at least one embodiment, an AC component $AC_{SMI,DU}$ of the output signals generated by the detector unit yields $$P_0 \cdot m' \cdot T_{BS} \cdot \cos\theta \cdot R_{BS}$$

with the laser output optical power $P_0$, modulation factor m' being a function of optical losses associated with the sensor module and $\theta$ is a function of the optical field phase. The AC component $A_{CSMI,DU}$ is in a local or global maximum for the overall splitting ratio $T_{BS}/R_{BS}$ of the optical element according to the pre-determined value.

The pre-determined value, e.g. the overall splitting ratio $T_{BS}/R_{BS}$ of the optical element allows to account for various types of optical losses both inside the sensor module and outside, e.g. associated with the external target. As the splitting ratio is subject to design choices of the sensor module and its components, optical losses can be accounted for already at a design level. Different values or ranges of values can be implemented. It should be noted the term "optimum" or "optimal" power ratio refers to the optical losses which are accounted for, rather than being absolute. What is considered an "optimum" or "optimal" power ratio may, thus, be subject to the desired application.

In at least one embodiment, the splitting ratio is set to equal or smaller than 50%, i.e. $T_{BS}/R_{BS}=50\%$. For example, if noise influence on detection is independent of the incident optical power (e.g. electronic noise), a ratio of $T_{BS}/R_{BS}=50\%$ can be sufficient to maximize optical power $P_{SMI,DU}$ and $P_{SMI}$.

In at least one embodiment, the optical power ratio is further determined by shot noise associated with the detector unit and wherein a signal-to-noise ratio $SNR(AC_{SMI,DU})$ of an AC component of the output signals generated by the detector unit yields $$\frac{\langle P_0 \cdot m' \cdot T_{BS} \cdot \cos\theta \cdot R_{BS}\rangle^2}{2q \cdot R_{BS} \cdot P_0 \cdot F \cdot B}$$

wherein F accounts for the relative intensity noise of the light emitter and B is the system bandwidth.

In a number of systems and applications (e.g., at lower light) noise, such as shot noise, may affect the optical power ratio in a non-negligible way. The SNR becomes a function of the overall splitting ratio $T_{BS}/R_{BS}$ and, thus, can be altered by way of the optical element. This results in a different pre-determined value, or splitting ratio.

In at least one embodiment, the splitting ratio is set to equal or smaller than 2/3, i.e. $T_{BS}/R_{BS}=2/3$. For example, if noise is independent of the incident optical power, a smaller ratio of $T_{BS}/R_{BS}=50\%$ may be set and can be sufficient to maximize optical power $P_{SMI,DU}$ and $P_{SMI}$. For example, a splitting ratio of $T_{BS}/R_{BS}=2/3$ has been found to account for shot noise.

In at least one embodiment, the sensor module further comprises a housing with a wall, top side and a bottom side. The light emitter and/or detector unit are arranged at the bottom side or wall. The optical element is arranged in the housing, such as to distribute the first fraction of electromagnetic radiation towards the external target and/or the light emitter and the second fraction of electromagnetic radiation towards the detector unit to generate the output signals.

In at least one embodiment, the light emitter, the detector unit and optionally an electronic processing unit form an integrated semiconductor device, such as a CMOS integrated circuit device, on a common substrate or carrier. In addition, or alternatively, the sensor module comprises the housing to form a sensor package into which the light emitters, detector unit and the electronic processing unit, or the integrated semiconductor device formed by the light emitters, detector unit and the electronic processing unit, are integrated.

In at least one embodiment, the optical element comprises a ball lens, a beam splitter, e.g. a dichroic beam splitter, or a combination thereof. The ball lens can be implemented as a solid immersion lens (SIL), e.g. a hemispherical SIL or a Weierstrass SIL. There are two types of SIL. A hemispherical SIL which can increase the numerical aperture up to n, n being the index of refraction of the material of the lens. Another type is denoted Weierstrass SIL (or super hemispherical SIL). Such a SIL comprises a truncated sphere which can increase the numerical aperture up to $n^2$. Both types of SIL are effective means to increase the numerical aperture, and thus also affect the splitting ratio $T_{BS}/R_{BS}$.

In at least one embodiment, the optical element comprises at least one coating layer. A coating layer directly affects the splitting ration by altering transmission and reflectivity. This way, in addition to alignment of the optical element, splitting can be tuned by means of material properties.

In at least one embodiment, the optical element is tilted with respect to the housing, i.e. with respect to the wall, top side and/or bottom side.

In at least one embodiment, the light emitter comprises a semiconductor laser diode, a resonant-cavity light emitting device, a distributed feedback laser and/or a vertical cavity surface emitting laser, VCSEL, diode. These devices feature coherent emission to generate SMI fringes. A resonant-cavity light emitting device can be considered a semiconductor device, which is operable to emit coherent light based on a resonance process. In this process, the resonant-cavity light emitting device may directly convert electrical energy into light, e.g., when pumped directly with an electrical current to create amplified stimulated emission.

For example, the light emitters comprise vertical cavity surface emitting laser, VCSEL, diodes. VCSELs are an example of a resonant-cavity light emitting device and feature a beam emission that is perpendicular to a main extension plane of a top surface of the VCSEL. The VCSEL diode can be formed from semiconductor layers on a substrate, wherein the semiconductor layers comprise two distributed Bragg reflectors enclosing active region layers in between and thus forming a cavity. VCSELs and their principle of operation are a well-known concept and are not further detailed throughout this disclosure. For example, the VCSEL diode is configured to have an emission wavelength of 940 nm, 850 nm, or another wavelength.

In at least one embodiment, the detector unit comprises at least one photodetector (or an array of photodetectors) to detect the electromagnetic radiation. The photodetector(s) can be integrated into a layer sequence of the light emitter. In addition, or alternatively, at least one photodetector is arranged outside the light emitter, i.e. is not integrated into a layer sequence of the light emitter.

Some configurations use an "internal" photodetector where the light emitter is grown epitaxially on top of the photodetector, or the photodetector is integrated in one ("bottom") of the laser DBR mirrors of a VCSEL. Those configurations can have good light-coupling efficiencies but can complicate the epitaxial semiconductor design and increase the growth process cost. External photodetectors can be configured side to side to the light emitter, e.g. VCSEL. They can be part of the same epitaxy, modifying the VCSEL epitaxy top DBR by wafer processing or they can be implemented from other systems (comparably cheap silicon photodetectors).

In at least one embodiment, an electronic device, comprising at least one self-mixing interferometry sensor module according to one of the aforementioned aspects, and a host system. The sensor module is integrated into the host system, and the host system comprises one of a mobile device, a smartphone, a wearable mobile device, etc.

An electronic device may use a self-mixing interferometry sensor module as part of detecting a data from an external target, e.g. at a distance or with respect to an input surface of the device, e.g. by swiping over or placing the finger on the input surface. Specifically, such a self-mixing interferometry sensor module can be used with a wide range of consumer and other electronic devices.

Furthermore, a method of determining an optical power ratio for a self-mixing interferometry sensor module is suggested.

Herein, the sensor module comprises a light emitter to emit coherent electromagnetic radiation towards an external object. A detector unit is operable to generate output signals indicative of an optical power output of the light emitter due to self-mixing interferometry. An optical element is arranged or aligned to direct a first fraction of electromagnetic radiation emitted by the light emitter towards the external target or the light emitter and to direct a second fraction of electromagnetic radiation is directed towards the detector unit.

The method comprising the steps of determining a first optical power associated with the first fraction of electromagnetic radiation as a function of the optical element, determining a second optical power associated with the second fraction of electromagnetic radiation as a function of the optical element, and determining the ratio of first and second optical power. The resulting ratio can be used a pre-determined value to design and/or align the sensor module.

In at least one embodiment, the optical power ratio is determined as a function of an overall splitting ratio $T_{BS}/R_{BS}$ of the optical element, wherein TIE denotes the transmission of the optical element with respect to the first fraction and $R_{BS}$ denotes the reflection of the optical element with respect of the second fraction of electromagnetic radiation.

In at least one embodiment, the first optical power and second optical power are adjusted to maximize the second optical power.

Further embodiments of the method become apparent to the skilled reader from the aforementioned embodiments of the self-mixing interferometry sensor module and of the electronic device, and vice-versa.

BRIEF DESCRIPTION OF THE DRAWINGS

The following description of figures may further illustrate and explain aspects of the self-mixing interferometry sensor module, electronic device and the method of determining an optical power ratio for self-mixing interferometry.

Components and parts of the self-mixing interferometry sensor that are functionally identical or have an identical effect are denoted by identical reference symbols. Identical or effectively identical components and parts might be described only with respect to the figures where they occur first. Their description is not necessarily repeated in successive figures.

In the figures:

Figure 3A:
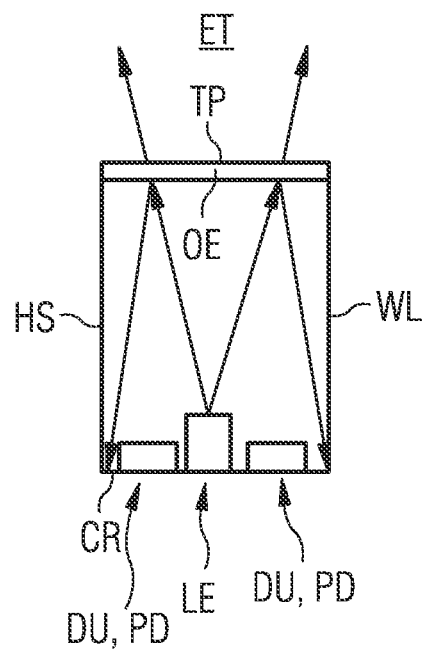
Figure 3B:
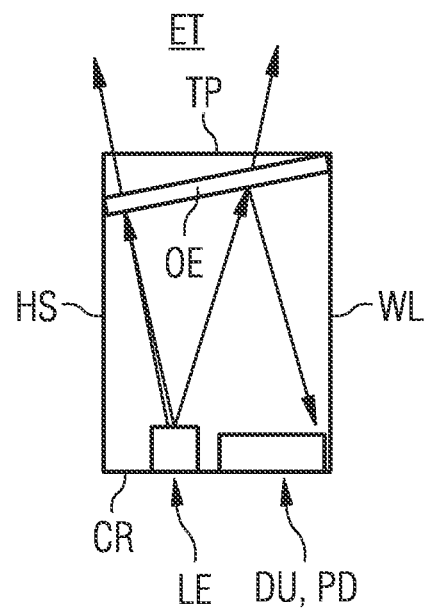
Figure 4A:
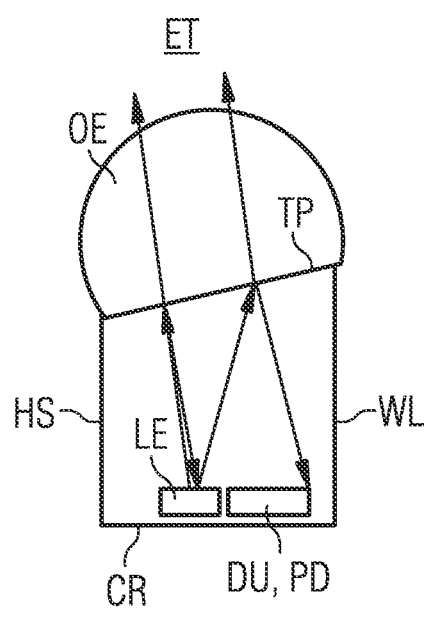
Figure 4B:
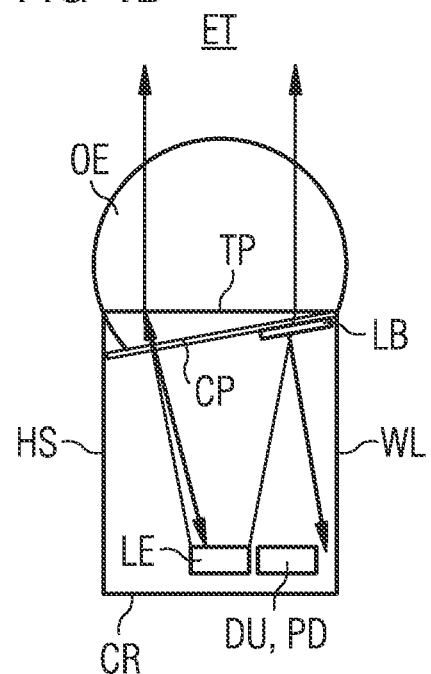

FIGS. 1a to 1c
show an example embodiment of self-mixing interferometry sensor module for a wearable electronic device, FIG. 2
shows example schematic of a splitting ratio, FIGS. 3A and 3B
show example embodiments of a sensor module for SMI, FIGS. 4A and 4B
show further example embodiments of a sensor module for SMI, FIGS. 5A to 5D
show further example embodiments of a sensor module for SMI, and FIGS. 6A and 6B
show further example embodiments of a sensor module for SMI.

DETAILED DESCRIPTION

The following discussion relates to various embodiments of self-mixing interferometry sensor modules. The sensor modules suggested herein comprise at least a light emitter LE, a detector unit DU and an optical element OE. The light emitter emits coherent electromagnetic radiation out of the sensor module, e.g. towards an external target ET. The light emitter undergoes self-mixing interference, SMI, which is caused by reflections of the emitted electromagnetic radiation from the external object back inside the sensor module.

The detector unit DU can be an internal part of or external of the light emitter LE. For example, the detector unit comprises a photodetector which generates output signals indicative of an optical power output of the light emitter as a result of SMI.

The optical element OE is aligned with respect to the light emitter LE. For example, the sensor module comprises a housing HS to mount and align its electronic and optical components. By way of the optical element a first fraction of electromagnetic radiation is directed towards an external object to be placed outside the sensor module and a second fraction of electromagnetic radiation is directed towards the detector unit DU. Thus, the optical element allows to steer beams inside the sensor module and determines a splitting ratio of said beams. For example, the optical element comprises a beam splitter, or a more complex optical system. The optical element implements a ratio of first and second fraction, which meets a pre-determined value. Said pre-determined value can be determined for a given optical design. A mathematical framework is discussed in the following.

Figure 1:
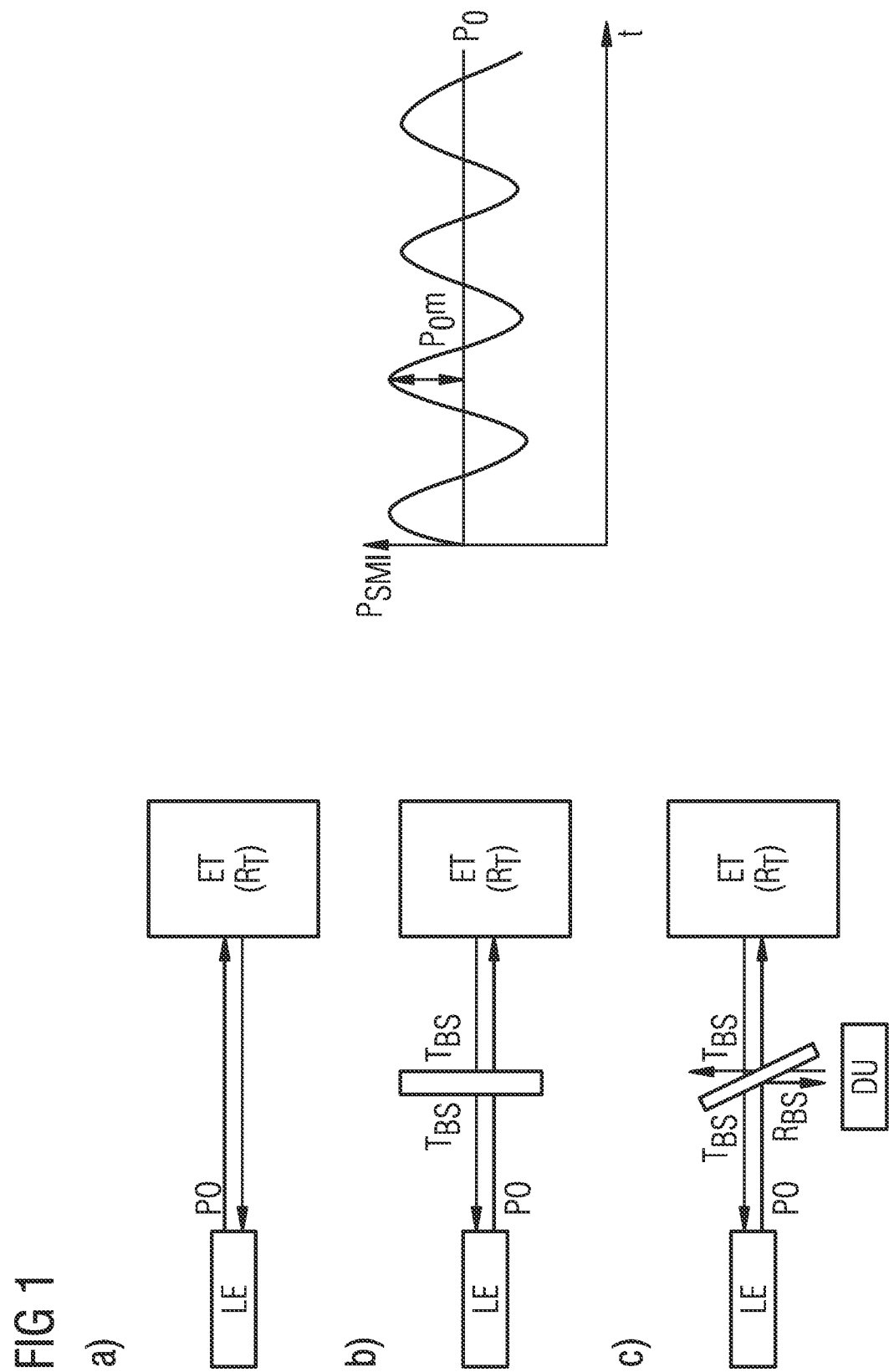

FIG. 1 shows a schematic overview of the method of determining an optical power ratio for self-mixing interferometry. The proposed concept analyzes the optimum power ratio between the light going from the light emitter to the external target to produce SMI and the power diverted to the detector unit DU to measure the SMI signal, i.e. the optimum splitting ratio used to detect the SMI signal in power read out configuration.

The drawings show a coherent light emitter LE and an external target ET. In figure a) the light emitter LE emits light towards the external target ET, which reflects back from the target into the light emitter, e.g. laser cavity, coupling back a small portion of the light (<10%). The optical power signal with target feedback can be described as:

$$P_{SMI}=P_0+P_0 \cdot m \cdot \cos\theta,$$

where m is known as the "modulation" factor, $P_0$ is the laser output optical power and $\theta$ is a function of the optical field phase. This function of time t is depicted on the right-hand side of the drawing. The modulation factor m is proportional to the square root of the total optical losses (i.e., in the simplest case, the target reflectivity): $m \sim \sqrt{R_T}$.

In figure b) an an optical element OE is introduced, e.g. a filter or beam splitter, in the middle of the optical path between light emitter LE and the external target. In this configuration transmission losses associated with the optical element need to be accounted for. The transmission is denoted $T_{BS}$. Thus, the optical power signal with target feedback yields:

$$P_{SMI}=P_0+P_0 \cdot m' \cdot T_{BS} \cdot \cos\theta.$$

The modulation factor m is modified to account for the transmission losses:

$$m=m' \cdot T_{BS}.$$

The optical element transmission $T_{BS}$ is counted twice because of the double pass, i.e. emission towards the target and reflection on the target. The modified modulation factor m' depends on the target reflectivity $R_T$ and of the light emitter $R_{LE}$ and yields:

$$m' = \frac{\sqrt{R_T}}{\sqrt{R_{LE}}} \cdot (1 - R_{LE}) \cdot \beta \cdot \frac{I_{op} - \frac{N_{tr}}{N_{th}} I_{th}}{I_{op} - I_{th}}.$$

The parameters of the equation are defined as follows:
$I_{op}$=laser drive operation current,
$I_{th}$=laser threshold current,
$N_{tr}$=carrier concentration at transparency,
$N_{th}$=carrier concentration at threshold,
$\beta$=optical mode coupling factor.

In figure c) the optical element OE is configured to reflect some light into an optical detector unit DU. For example, the detector unit comprises a photodetector, electronics and signal processing, so a SMI signal can be measured. In the depicted embodiment, the optical element OE comprises a beam splitter so that part of the reflected light can be redirected towards the detector unit. The optical element has a reflectivity of $R_{BS}$.

Thus, the optical power signal measured by the optical detector unit DU is denoted $P_{SMI,DU}$ and yields:

$$P_{SMI,DU}=P_{SMI} R_{BS}.$$

This equation can be reformulated as follows:

$$P_{SMI,DU} = (P_0 + P_0 \cdot m' \cdot T_{BS} \cdot \cos\theta) \cdot R_{BS}$$
$$= P_0 \cdot R_{BS} + P_0 \cdot m' \cdot T_{BS} \cdot \cos\theta \cdot R_{BS}.$$

The first part of the optical power $P_0 \cdot R_{BS}$ is considered as a DC SMI signal and the second term $P_0 \cdot m' \cdot T_{BS} \cdot \cos\theta \cdot R_{BS}$ corresponds to an AC SMI signal that contains information of the target (distance, speed, etc.). The AC SMI signal depends on the transmission $T_{BS}$ and the reflection $R_{BS}$ of the optical element OE, or a splitting ratio $T_{BS}/R_{BS}$ as $R_{BS}=1-T_{BS}$. For example, the AC SMI signal can be detected by means of the detector unit DU, e.g. by means of a photodetector (internal or external) and is denoted $A_{CSMI,DU}$.

FIG. 2 shows example schematic of a splitting ratio. The splitting ratio introduced above is a means to estimate an optimal power ratio. The power ratio determines the relative optical power of reflected light which, via the optical element OE, is coupled back into the cavity of the light emitter LE and the optical power of reflected light which is directed towards the detector unit DU. For example, the SMI signal amplitude can be measured by means of photodetector of the detector unit DU. The term "optimal" or "optimum" should not be understand in an absolute sense. Rather these terms are determined by the parameters used to calculate or estimate the power ratio as will be discussed below.

For example, the graph on the left side of FIG. 2 shows normalized signal amplitudes of the SMI signal as a function of the reflectivity of the optical element OE, i.e. R=1−T. The graph assumes that optical losses of the sensor module are included in the transmission $T_{BS}$ and the reflection $R_{BS}$ of the optical element OE, as well as the modified modulation factor m'. Under these circumstances the power ratio, i.e. the ratio resulting in a maximum SMI signal amplitude $P_0 \cdot m' \cdot T_{BS} \cdot \cos \theta \cdot R_{Bs}$ is determined by a splitting ratio $T_{BS}/R_{BS}$ of 50%, i.e. R=1−T=50%, as indicated in the drawing. This splitting can be implemented by means of the 50/50 beam splitter as optical element OE, for example. The graph also shows a corresponding SMI voltage signal change with the amount of reflected light. Theoretically, the SMI signal is independent of the optical power and any power splitting is translated in a loss. Thus, for an idealized configuration which only considers the splitting ratio of the optical element OE, a splitting ratio $T_{BS}/R_{BS}$ of 50% can be considered optimal for power readout. In this example, no extra optical losses are considered except for the splitting ratio, which can be reasonable concept for a sensor module which relies on an external photodetector, i.e. external with respect to the light emitter LE.

In another level of accuracy, however, a system could be considered "quantum noise" limited, i.e. the noise floor will be the shot noise associated with the detector unit, e.g. photodiode, and the SNR of the system can be calculated as the ratio of the squares of the signal vs the noise. In such a configuration the signal-to-noise ratio, SNR, at the detector unit yields:

$$SNR(AC_{SMI,DU}) = \frac{\langle P_0 \cdot m' \cdot T_{BS} \cdot \cos\theta \cdot R_{BS} \rangle^2}{2q \cdot R_{BS} \cdot P_0 \cdot F \cdot B}$$

where F accounts for the relative intensity noise (RIN) of the light emitter LE and B is the system bandwidth.

The graph on the right side of FIG. 2 shows normalized signal amplitudes of the SMI signal as a function of the reflectivity of the optical element OE, i.e. R=1−T. Under these circumstances the power ratio, i.e. the ratio resulting in a maximum SMI signal amplitude $P_0 \cdot m' \cdot T_{BS} \cdot \cos \theta \cdot R_{BS}$ is determined by a splitting ratio $T_{BS}/R_{BS}$ of around 66% or 2 over 3, i.e. R=1−T=1/3≈33%, as indicated in the drawing. This splitting can be implemented by means of the 50/50 beam splitter as optical element OE or more complex optical designs, but may need different optical paths and/or use of additional coatings to adjust the splitting ratio $T_{BS}/R_{BS}$.

The mathematical concept derived above provides a convenient framework to guide implementation of the optical design of self-mixing interferometry sensor modules. The framework allows to consider optical loses for a particular configuration, e.g. external photodetector vs. internal photodetector, etc. by means of optical design or hardware, e.g. optics. Further optical losses can be accounted for if deemed necessary. For example, consider a VCSEL laser, or any other semiconductor laser, as light emitter LE. Changing the mirrors reflectivity can be accounted for by adjusting the SMI modulation factor m. Substrate losses are included in the laser output optical power $P_0$ for bottom-side emitting lasers.

The following figures show various implementations of sensor modules. These examples implement the splitting ratio of first and second fractions of emitted electromagnetic radiation. The splitting ratio is considered a pre-determined value and can be calculated along the lines introduced above. For example, the splitting ratio is given by $T_{BS}/R_{BS}$ of the optical element. In general, said ratio can be determined by a single optical element OE, such as a beam splitter, and denotes the ratio of transmission towards/from the light emitter and reflection to the detector unit DU of the single optical element. In case of more complex optical elements comprising a combination of several single elements, splitting ratio is considered an overall ratio of the complex optical element. The overall optical losses and optical absorption may be accounted for in the formula but the principle is the same. The sensor modules comprise a package with a housing HS, e.g. a molded housing. The housing encloses the at least one light emitter LE, detector unit DU and optical element OE. The housing comprises walls WL to optically separate the sensor module from the ambient. Furthermore, the housing provides means to mount and/or align the optical and electronic components, including the at least one light emitter LE, detector unit DU and optical element OE. Furthermore, the sensor modules comprise a carrier CR, which may be part of the housing and/or a substrate or integrated circuit. The housing is arranged on the carrier, for example. The housing provides a hollow space, or chamber, which encloses the at least one light emitter LE and the detector unit DU, which are arranged in or on the carrier or the carrier, i.e. substrate and/or integrated circuit. Furthermore, the housing provides one or more apertures for light to be emitted out of the sensor module and for light to be reflected into the sensor module.

The package may for example be implemented as a TO can, i.e.

a common transistor-outline-can (TO-can) package for optical components. A TO package comprises two components: a TO header (carrier) and a TO cap (housing). While the TO header ensures that the encapsulated components are provided with power, the cap ensures the transmission of optical signals.

The arrows in the drawing indicate how light emitted by the light emitter LE travels through the sensor module and towards an external target ET. It should be noted that self-mixing interference builds up almost the moment the sensor module starts emitting light towards the target. The drawings implicitly assume that SMI is already established by means of reflections at the target. In this sense in SMI the "signal" is "everywhere" when the feedback from the target is present. Thus, hereinafter not all light beams are indicated in the graphs. The arrows shown in the figures relate to transmission and reflection on the optical element.

FIGS. 3A and 3B show example embodiments of a sensor module for SMI. In FIG. 3A the optical element is arranged on top TP of the housing TP, opposite to the carrier CR at the bottom of the housing. The optical element is essentially parallel with respect to the carrier. In this embodiment the detector unit DU comprises two photodetectors PD, which flank the light emitter LE in the middle. The optical element OE can be implemented as a transparent cover plate, for example. As an alternative, the optical element OE can be implemented as an optical lens. In FIG. 3B the optical element is arranged on top of the housing, opposite to the carrier at the bottom of the housing. However, the optical element is tilted with respect to the carrier. In this embodiment the detector unit comprises one photodetector, which is arranged on the carrier next to the light emitter LE. The optical element OE can be implemented as a transparent cover plate CP, for example.

For example, TO cans and other packaging configurations use a cover glass as optical element to reflect some light to the photodetector(s) or power monitor of the detector unit DU to control the power variations of the light emitter LE. In this case, to reduce optical losses, the photodetectors can be oversized (FIG. 3B) or use several photodetectors PD can be implemented (FIG. 3B). Both configurations may, however, increase costs.

In both embodiments, the optical element OE splits the emitted light beam or received light beam according to a splitting ratio given by $T_{BS}/R_{BS}$. The transmission and reflection are set by design to split corresponding fractions of electromagnetic radiation according to a predetermined ratio. For example, with a desired ratio $T_{BS}/R_{BS}$ of around 50% the splitting can be implemented by means of a 50/50 beam splitter as optical element as shown in FIG. 3A. A different desired ratio $T_{BS}/R_{BS}$, e.g. of around 66% can be implemented by adjusting the transmission and reflection. In other words, a first fraction of electromagnetic radiation is directed towards the external object and a second fraction of electromagnetic radiation is directed towards the detector unit DU in order to detect a SMI signal.

This can be done by means of a coating layer (not shown), such as an anti-reflection layer. With respect to FIG. 3A the so coated cover can act as a beam splitter with different ratio, e.g. a 60/40 beam splitter. Alternatively, or in addition, the optical element can be tilted, which essentially alters the transmission and reflection due to different angles of incidence.

FIGS. 4A and 4B show further example embodiments of a sensor module for SMI. In these examples, the optical element OE comprises a partial ball lens, which is arranged on top TP of the housing HS, opposite to the carrier CR at the bottom of the housing. The ball lens can be implemented as a solid immersion lens (SIL), e.g. a hemispherical SIL or a Weierstrass SIL. There are two types of SIL. A hemispherical SIL which can increase the numerical aperture up to n, n being the index of refraction of the material of the lens. Another type is denoted Weierstrass SIL (or super hemispherical SIL). Such a SIL comprises a truncated sphere which can increase the numerical aperture up to $n^2$. Both types of SIL are effective means to increase the numerical aperture, and, thus effects also the splitting ratio $T_{BS}/R_{BS}$. Numerical aperture indicates the range of angles over which the system can accept or emit light. This effectively increases numerical apertures and, thus, enhance detection efficiency.

The ball lenses in FIGS. 4A and 4B have a base, which is tilted with respect to the carrier. The tilt is chosen such that the emitted light beam or received light beam are split according to a splitting ratio given by $T_{BS}/R_{BS}$. The amount of tilt allows to fine tune the splitting ratio to a desired value, e.g. 50% or 66%, or any other value. As a consequence, of relative amounts of transmission and reflection corresponding fractions of electromagnetic radiation are splitted according to the predetermined ratio.

FIG. 4A shows a sensor module for SMI with a tilted partial ball lens. FIG. 4B shows a modified sensor module, where the tilted partial ball lens is arranged on a transparent cover plate CP. The transparent cover plate is partly covered with a light blocking structure LB, which blocks stray light from reaching the photodetector. The tilted partial ball lens and transparent cover plate together form the optical element OE, which effectively leads to an overall splitting ratio with a desired value, e.g. 50% or 66%, or any other value.

FIGS. 5A to 5D show further example embodiments of a sensor module for SMI. These examples are modifications of the embodiments shown in FIGS. 3A, 3B and 4A, 4B.

Figure 5A:
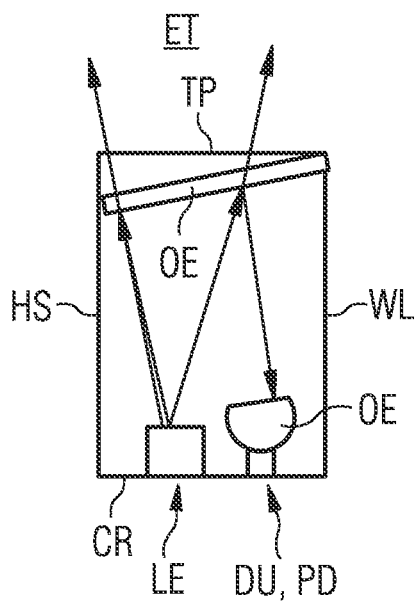

The embodiment in FIG. 5A is based on the corresponding example in FIG. 3B. The optical element comprises the tilted cover plate and, additionally, a partial ball lens arranged on the detector unit DU, e.g. the photodetector.

Figure 5B:
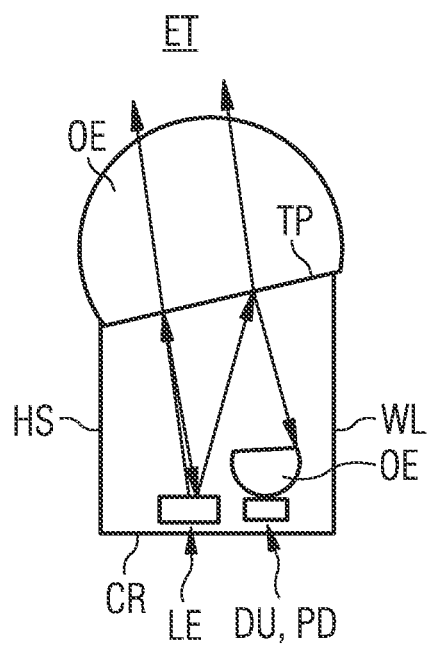

The embodiment in FIG. 5B is based on the corresponding example in FIG. 4A. The optical element comprises the tilted ball lens and, additionally, a partial ball lens arranged on the detector unit DU, e.g. the photodetector.

Figure 5C:
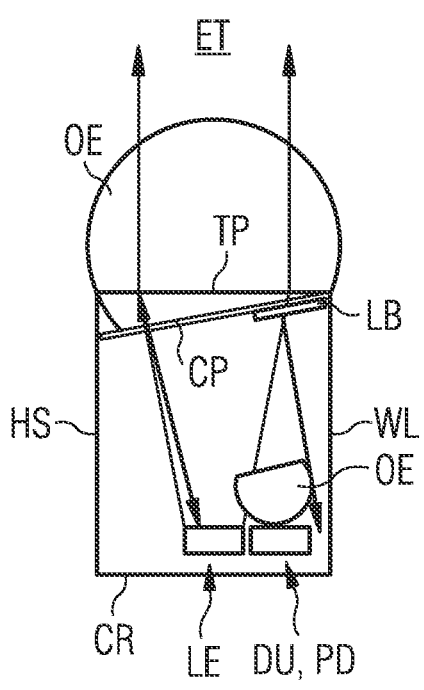

The embodiment in FIG. 5C is based on the corresponding example in FIG. 4B. The optical element comprises the tilted ball lens and, additionally, a partial ball lens arranged on the detector unit DU, e.g. the photodetector. The tilted partial ball lens is arranged on a transparent cover plate. The transparent cover plate is partly covered with a light blocking structure, which blocks stray light from reaching the photodetector.

Figure 5D:
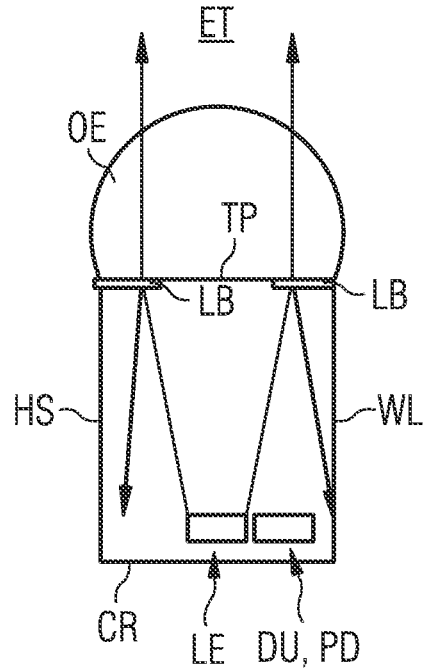

The embodiment in FIG. 5D can be considered a mixture of several examples. With respect to FIG. 3A a partial ball lens is arranged on the transparent cover plate, i.e. the base of the partial ball lens is parallel with the carrier. Furthermore, the transparent cover plate is partly covered with a light blocking structure, which blocks stray light from reaching the photodetector. For example, the light blocking structure is arranged on the transparent cover plate opposite of photodetectors of the detector unit.

FIGS. 6A and 6B show further example embodiments of a sensor module for SMI. These examples are based on the embodiments with partial ball lenses and are complemented with a beam splitter. The optical element is a hybrid system and comprises both a partial ball lens and the beam splitter. The light emitter is arranged on the carrier CR while one or two photodetectors PD of the detector unit DU are arranged on the walls WL of the housing HS.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Furthermore, as used herein, the term "comprising" does not exclude other elements. In addition, as used herein, the article "a" is intended to include one or more than one component or element, and is not limited to be construed as meaning only one.

REFERENCES

CP cover plate
CR carrier
DU detector unit
ET external target
HS housing
LB light blocking structure
LE light emitter
OE optical element
PD photodetector
TP top of the housing
WL wall

The invention claimed is:

1. A self-mixing interferometry sensor module, comprising a light emitter, a detector unit and an optical element, wherein the light emitter is operable to:
   emit coherent electromagnetic radiation towards an external object to be placed outside the sensor module; and
   undergo self-mixing interference, SMI, caused by reflections of the emitted electromagnetic radiation from the external object back inside the sensor module; wherein the detector unit is operable to:
   generate output signals indicative of an optical power output of the light emitter due to the SMI; wherein the optical element is aligned with respect to the light emitter such that:
   a first fraction of electromagnetic radiation is directed towards the external target and/or the light emitter and a second fraction of electromagnetic radiation is directed towards the detector unit to generate the output signals, and such that
   an optical power ratio of the first and second fractions meets a pre-determined value,
   wherein the optical power ratio is further determined by shot noise associated with the detector unit and wherein a signal-to-noise ratio $SNR(AC_{SMI,DU})$ of an AC component of the output signals generated by the detector unit (DU) yields $$(P_0 \cdot m' \cdot T_{BS} \cdot \cos\theta \cdot R_{BS})^2$$

wherein F accounts for a relative intensity noise of the light emitter and B is a system bandwidth,
   wherein $T_{BS}$ denotes a transmission of the optical element with respect to the first fraction of the electromagnetic radiation, and $R_{BS}$ denotes a reflection of the optical element with respect of the second fraction of electromagnetic radiation,
   wherein $P_0$ is the optical power output, m' is a modulation factor that is a function of optical losses associated with the sensor module, and $\theta$ is a function of an optical field phase.

2. The sensor module according to claim 1, wherein the optical power ratio is a function of an overall splitting ratio $T_{BS}/R_{BS}$ of the optical element.

3. The sensor module according to claim 1, wherein optical power $P_{SMI,DU}$ associated with the second fraction directed to the detector unit is determined by $$P_{SMI,DU} = P_{SMI} \cdot R_{BS}$$

wherein $P_{SMI}$ denotes the optical power associated with the first fraction directed to or emitted by the light emitter as a result of SMI.

4. The sensor module according to claim 2, wherein an AC component $AC_{SMI,DU}$ of the output signals generated by the detector unit yields $$P_0 \cdot m' \cdot T_{BS} \cdot \cos\theta \cdot R_{BS}$$

wherein
   the AC component $AC_{SMI,DU}$ is in a local or global maximum for the overall splitting ratio $T_{BS}/R_{BS}$ of the optical element.

5. The sensor module according to claim 2, wherein the reflection of the optical element is around 50%.

6. The sensor module according to claim 1, wherein the reflection of the optical element is around 33%.

7. The sensor module according to claim 1, further comprising a housing with a wall, top side and a bottom side, wherein:
   the light emitter and/or detector unit are arranged at the bottom side or wall, and
   the optical element is arranged in the housing, such as to distribute the first fraction of electromagnetic radiation towards the external target and/or the light emitter (LE) and the second fraction of electromagnetic radiation towards the detector unit to generate the output signals.

8. The sensor module according to claim 7, wherein the optical element comprises:
   a ball lens,
   a beam splitter,
   a dichroic beam splitter, or
   a combination thereof.

9. The sensor module according to one of claim 1, wherein the optical element comprises at least one coating layer.

10. The sensor module according to claim 7, wherein the optical element is tilted with respect to the wall, top side and/or bottom side.

11. The sensor module according to claim 1, wherein the light emitter comprises:
    a semiconductor laser diode,
    a resonant-cavity light emitting device,
    a distributed feedback laser and/or
    a vertical cavity surface emitting laser, VCSEL, diode.

12. The sensor module according to claim 1, wherein the detector unit comprises
    at least one photodetector to detect the electromagnetic radiation integrated into a layer sequence of the light emitter, and/or
    at least one photodetector to detect the electromagnetic radiation, which is outside the light emitter.

13. An electronic device, comprising at least one self-mixing interferometry sensor module according to claim 1, and a host system, wherein:
    the sensor module is integrated into the host system, and
    the host system comprises one of: a mobile device, a smartphone, a wearable mobile device.

14. A method of determining an optical power ratio for a self-mixing interferometry sensor module, wherein the sensor module comprises:
    a light emitter to emit coherent electromagnetic radiation towards an external object,
    a detector unit to generate output signals indicative of an optical power output of the light emitter due to self-mixing interferometry and
    an optical element to direct a first fraction of electromagnetic radiation emitted by the light emitter towards the external target or the light emitter and to direct a second fraction of electromagnetic radiation is directed towards the detector unit, the method comprising:

determining a first optical power associated with the first fraction of electromagnetic radiation as a function of the optical element,
determining a second optical power associated with the second fraction of electromagnetic radiation as a function of the optical element, and
determining the ratio of first and second optical power.

15. The method according to claim 14, wherein the optical power ratio is determined as a function of an overall splitting ratio $T_{BS}/R_{BS}$ of the optical element, wherein $T_{BS}$ denotes the transmission of the optical element with respect to the first fraction and $R_{BS}$ denotes the reflection of the optical element with respect of the second fraction of electromagnetic radiation.

16. The method according to claim 14, wherein the first optical power and second optical power are adjusted to maximize the second optical power.

17. The method according to claim 14 comprising:
determining the optical element splitting ratio based on the determined ratio of the first and second optical power.

18. A self-mixing interferometry sensor module, comprising a light emitter, a detector unit and an optical element, wherein the light emitter is operable to:
emit coherent electromagnetic radiation towards an external object to be placed outside the sensor module; and
undergo self-mixing interference, SMI, caused by reflections of the emitted electromagnetic radiation from the external object back inside the sensor module; wherein the detector unit is operable to:
generate output signals indicative of an optical power output of the light emitter due to the SMI; wherein the optical element is aligned with respect to the light emitter such that:
a first fraction of electromagnetic radiation is directed towards the external target and/or the light emitter and a second fraction of electromagnetic radiation is directed towards the detector unit to generate the output signals, and such that
an optical power ratio of the first and second fractions meets a pre-determined value,
wherein the optical element comprises a ball lens.

19. The sensor module according to claim 18, wherein the ball lens of the optical element is a partial ball lens, which comprises a base which is tilted with respect to a carrier, and a splitting ratio is fine-tuned by an amount of the tilt.

* * * * *

UNITED STATES PATENT AND TRADEMARK OFFICE
CERTIFICATE OF CORRECTION

PATENT NO. : 11,927,441 B1
APPLICATION NO. : 17/821077
DATED : March 12, 2024
INVENTOR(S) : Ferran Suarez et al.

It is certified that error appears in the above-identified patent and that said Letters Patent is hereby corrected as shown below:

In the Claims

In Claim 1, at Column 13, Line 44, "$(P_0 \cdot m' \cdot T_{BS} \cdot \cos\theta \cdot R_{BS})^2$" should be $$-- \frac{(P_0 \cdot m' \cdot T_{BS} \cdot \cos\theta \cdot R_{BS})^2}{2q \cdot R_{BS} \cdot P_0 \cdot F \cdot B} --.$$

Signed and Sealed this
Eighteenth Day of February, 2025

Coke Morgan Stewart
*Acting Director of the United States Patent and Trademark Office*